United States Patent
Wilson (10) Patent No.: US 9,778,938 B2
(45) Date of Patent: Oct. 3, 2017

(54) SELECTING OPERATING SYSTEMS BASED ON A COMPUTING DEVICE MODE

(71) Applicant: HEWLETT-PACKARD DEVELOPMENT COMPANY, L.P., Houston, TX (US)

(72) Inventor: Evan Joel Wilson, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/911,279

(22) PCT Filed: Sep. 30, 2013

(86) PCT No.: PCT/US2013/062727
§ 371 (c)(1),
(2) Date: Feb. 10, 2016

(87) PCT Pub. No.: WO2015/047416
PCT Pub. Date: Apr. 2, 2015

(65) Prior Publication Data
US 2016/0196146 A1 Jul. 7, 2016

(51) Int. Cl.
*G06F 1/00* (2006.01)
*G06F 9/44* (2006.01)
*G06F 9/54* (2006.01)

(52) U.S. Cl.
CPC .............. *G06F 9/441* (2013.01); *G06F 9/54* (2013.01)

(58) Field of Classification Search
CPC .................................. G06F 9/441; G06F 9/54
See application file for complete search history.

(56) References Cited

U.S. PATENT DOCUMENTS

| 6,314,501 | B1 | 11/2001 | Gulick |
| 6,615,303 | B1 | 9/2003 | Endo et al. |
| 6,763,458 | B1 | 7/2004 | Watanabe et al. |
| 7,500,090 | B2 | 3/2009 | Mondshine et al. |
| 7,506,152 | B2 | 3/2009 | Park et al. |
| 2009/0061838 | A1 | 3/2009 | Lin |
| 2010/0211769 | A1 | 8/2010 | Shankar et al. |
| 2012/0084542 | A1 | 4/2012 | Reeves et al. |
| 2012/0084792 | A1 | 4/2012 | Benedek et al. |

(Continued)

FOREIGN PATENT DOCUMENTS

| CN | 101000566 A | 7/2007 |
| CN | 101194456 A | 6/2008 |

(Continued)

OTHER PUBLICATIONS

US 5,314,501, 05/1994, Gulick et al. (withdrawn)

(Continued)

*Primary Examiner* — Austin Hicks
(74) *Attorney, Agent, or Firm* — HP Patent Department (57) ABSTRACT

A computing device in accordance with an example includes a first operating system and a second operating system. The computing device includes a communication channel to exchange data between the first and second operating systems, and a controller to select one of the first and second operating systems based on a mode of the computing device, where the first and second operating systems are executed substantially in parallel on a processor of the computing device.

16 Claims, 5 Drawing Sheets

(56) References Cited

U.S. PATENT DOCUMENTS

2012/0166676 A1\* 6/2012 Roper ..................... G06F 9/54
709/250
2013/0024778 A1 1/2013 Reeves et al.
2013/0298141 A1\* 11/2013 Wolfe ................... G06F 9/4443
719/319

FOREIGN PATENT DOCUMENTS

| CN | 101382833 | A | 3/2009 |
|---|---|---|---|
| CN | 101383780 | A | 3/2009 |
| EP | 2034388 | | 3/2009 |
| EP | 2527974 | A2 | 11/2012 |

OTHER PUBLICATIONS

Cnet; "The All-in-one/tablet Hybrid That's hard not to like"; Jun. 13, 2013; 11 pages.
European Patent Office, Extended European Search Report for Appl. No. 13894846.8 dated Apr. 13, 2017 (8 pages).
PCT; "Notification of Transmittal of the International Search Report and the Written Opinion of the International Searching Authority, or the Declaration"; cited in PCT/US2013/062727; dated Jun. 27, 2014; 11 pages.

\* cited by examiner

SELECTING OPERATING SYSTEMS BASED ON A COMPUTING DEVICE MODE

BACKGROUND

A notebook is a portable personal computer with a clamshell form factor suitable for mobile or stationary use. A notebook may have a display member and a base member that includes a keyboard. A tablet computer is a one-piece mobile computer. A tablet may have a touchscreen to enable interaction with a finger or stylus. Due to its lack of a physical input device, such as a physical keyboard, a tablet may be well suited for content consumption. Conversely, a notebook may be better suited for content creating due to the inclusion of physical input devices.

BRIEF DESCRIPTION OF THE DRAWINGS

Some examples of the present application are described with respect to the following figures.

DETAILED DESCRIPTION

Hybrid devices that can convert between a tablet mode and a notebook mode are becoming increasingly popular. In the notebook mode, at least a touch sensitive pointing device or physical keyboard can be accessible to the user. In the tablet mode, one or more of these input devices (i.e., touch sensitive pointing device or physical keyboard) are rendered inaccessible by the user to render the device more suitable for other purposes.

Certain operating systems function better with a particular form factor (or mode) and present a better case of use for a user. For example, some operating systems are better suited for the tablet mode and are better designed for touch input, and some other operating systems are better suited for the notebook mode und are better designed for the traditional keyboard and mouse input. It would be beneficial to a user of a hybrid computing device to have multiple operating systems that executes on the same processor and seamlessly transition from one operating system to the other depending on whether the computing device is in the tablet mode or the notebook mode. Further, the multiple operating systems can share the resources of the computing device (e.g., CPU, memory, I/O, power supply, etc.). Thus, applications from both operating system can execute concurrently on a graphical user interface (GUI) of a selected (i.e., selected based on the current form factor of the device) operating system. Such a device would improve user experience, and reduce the cost and complexity of running multiple operating systems since the operating systems will use the same hardware architecture. For example, the multiple operating systems can execute on the single architecture by using hardware and/or software visualization or emulation. It should be noted that in some examples, the multiple operating systems may be loaded to the processor (i.e., the same processor) from a memory of the computing device. For example, a first operating system and a second operating system may be stored on non-volatile memory of the computing device and loaded from the non-volatile to the system memory where they are executed by the processor.

In certain examples, the hardware architecture may be based on reduced instruction set computing (RISC) and/or complex instruction set computing (CISC). Accordingly, the processor may be optimized for RISC and/or CISC, for example. Some example operating systems commonly available include Android®, Berkeley Software Distribution (BSD) or Berkeley Unix®, iOS®, Linux®, Microsoft Windows®.

In one example, a hybrid computing device includes a first operating system and a second operating system. The device also includes a communication channel to exchange data between the first and second operating systems, and a controller to select one of the first and second operating systems based on a mode of the computing device, where the first and second operating systems execute substantially in parallel on a processor of the computing device.

In another example, a method for selecting operating systems includes selecting one of a first operating system and a second operating system as a control operating system executing on a processor of a computing device based on a mode of the computing device. The method includes selecting another of the first and second operating system as a background operating system executing substantially in parallel on the processor. The method includes establishing a communication channel between the control operating system and the background operating system, the communication channel to exchange data between the control operating system and the background operating system. The method also includes executing at least one application of the background operating system on a graphical user interlace (GUI) of the control operating system while executing applications of the control operating system on be GUI.

In another example, a non-transitory computer-readable storage medium includes instructions that if executed cause a controller of a computing device to select one of a first operating system and a second operating system as a control operating system executing on a processor of the computing device based on whether the computing device is in a tablet mode or a notebook mode. The instructions cause the controller to select another of the first and second operating systems as a background operating system executing substantially concurrently on the processor based on whether the computing device is in the tablet mode or the notebook mode. The instructions cause the controller to communicate data between the control operating system and the background operating system, and to launch and execute at least one application of the background operating system on a graphical user interface (GUI) of the control operating system substantially concurrently with execution of applications of the control operating system on the GUI.

Figure 1:
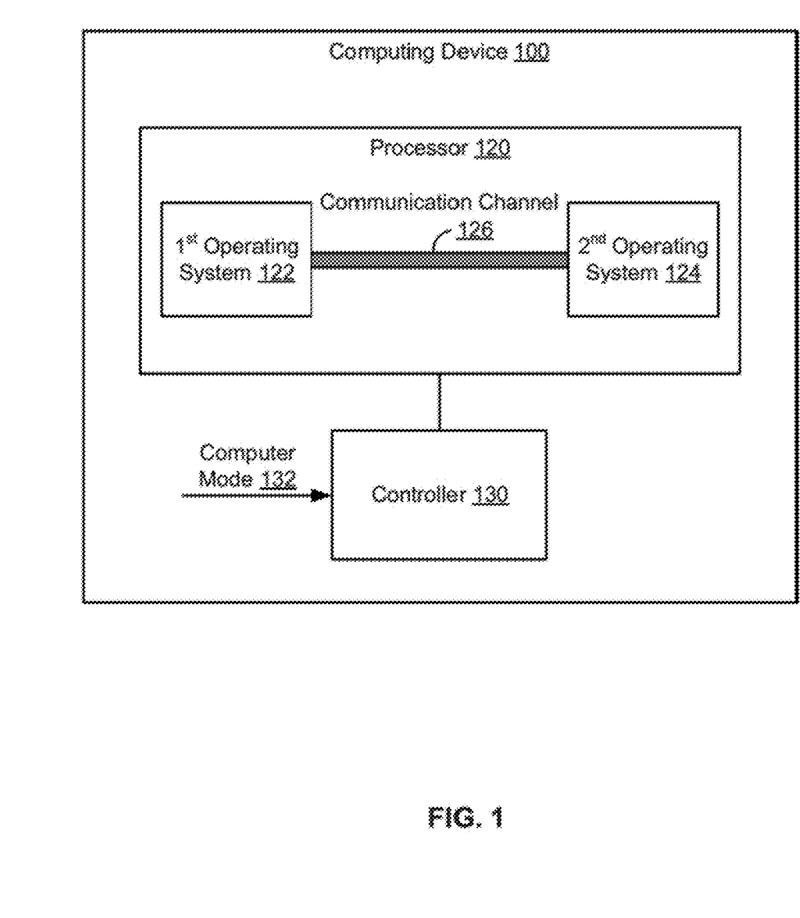
FIG. 1 illustrates an example of a computing device including first and second operating systems and a controller to select an operating systems.

Referring now to the figures, FIG. 1 is an example of a computing device including first and second operating systems and a controller to select the operating systems. Computing device 100 can be a hybrid portable computing device that can operate in a tablet mode or a notebook node, Accordingly, computing device 100 can include a base member (not shown) and a display member (not shown) that may be detached. The display member may be a metal, plastic, fiber resin, or another material. The display member may enclose a display such as an LCD (liquid crystal display). OLED (organic light emitting display), or another type of display. The display may be a touch screen display that can recognize a user interacting with the display, for example via touching the display. The base member may be metal, plastic, fiber, resin, or and/or material. The base member may include input devices such as a keyboard, a touch sensitive pointing device, or other input devices. In some examples, the base member is a docking station for docking the tablet and may include input devices and/or ports. In the tablet mode, the display member is detached from the base member. In the notebook mode, the display member is attached to the base member. In some examples, the display member may include components of the computing device 100 such as processor 120, controller 130, memory, mass storage, printed circuit board, battery, or other components.

Processor 120 can be hardware and/or software that include a first operating system 122 and a second operating system 124. First operating system 122 and second operating system 124 may load and execute applications. In some examples, processor 120 includes a memory, where the first operating system 122 and second operating system 124 are stored. For example, the first operating system 122 and the second operating system 124 may be loaded to the processor 120 from a memory of the computing device (or of the processor 120). The memory may be a non-volatile memory, and the first and second operating systems 122 and 124 may be loaded from the non-volatile memory to the processor 120 where they are executed. Thus, the memory can be internal to or external to the processor 120. Processor 120 can be a single core processor, a multi-core processor, or any other type of processor.

The first operating system 122 and the second operating system 124 can establish a communication channel 126 to communicate and exchange data. In some examples, the communication channel 126 is a driver or remote desktop software for example. In certain examples, the processor 120 facilitates communication between the first operating system 122 and the second operating system 124 based on the driver or software being executed by the operating systems. In some examples, communication channel 126 may emulate hardware connections (i.e., USB, HDMI, Ethernet, etc) in order to pass input/output between the first operating system 122 and the second operating system 124. In other examples, the communication channel 126 may emulate an Internet protocol such that one operating system hosts a server and the other operating system is a client, and data is passed back and forth (e.g., similar to a remote desktop software).

Controller 130 is any general purpose for selecting one of first operating system 122 and second operating system 124 based on the mode of the computing device 100. Controller 130 can be, for example, a processor, a semiconductor-based microprocessor, an integrated circuit (IC), or any other device suitable for selecting an operating system based on the mode 132 of the computing device 100.

In response to detecting a mode 132 of computing device 100, controller 130 selects one of the first operating system 122 and the second operating system 124 as a control operating system of the computing device 100. For example, if the device 100 is in the tablet mode (e.g., by detaching the display member from the base member), controller 130 may load and execute either the first operating system 122 or the second operating system 122 as the control operating system. Accordingly, the other of the first operating system 122 and second operating system 124 is a background operating system executing substantially in parallel (e.g., simultaneously or concurrently) on the processor 120.

The control operating system controls input and output of the computing device 100. For example, the control operating system may control the display member of the computing device and accept input from the user and generate output for the user via a graphical user interface. Although the control operating system is in control of the computing device 100 in a current form factor/mode, applications of the background operating system can be launched and executed on the control operating system in parallel (or simultaneously/concurrently) with applications of the control operating system, because the control operating system and background operating system can communicate and exchange data via the communication channel 126. For example, one or more applications of the background operating system can be launched on a GUI of the control operating system, whereby the user can interact with the application (i.e., provide input and receive output). Thus, the background operating system is able to generate input/output events on the control operating system.

For example, if a user input is received for a background application on the GUI of the control application, the user input is passed to the background operating system via the communication channel 126. Because the background operating system is still executing on the processor (i.e., hardware architecture), the background operating system can generate m output in response to the user input. The generated output is passed from the background operating system to the control operating system via the communication channel 126, and the output is displayed to the user on the GUI. Thus, to the user, it would seem like the control operating system was executing the applications from the background operating system.

If the mode 132 of the device 100 is changed, the controller seamlessly switches from one operating system to the other, changing the operating system that becomes the control operating system and the background operating system. In some examples, the user may be provided with the option of selecting which operating system to select for a particular mode.

Figure 2:
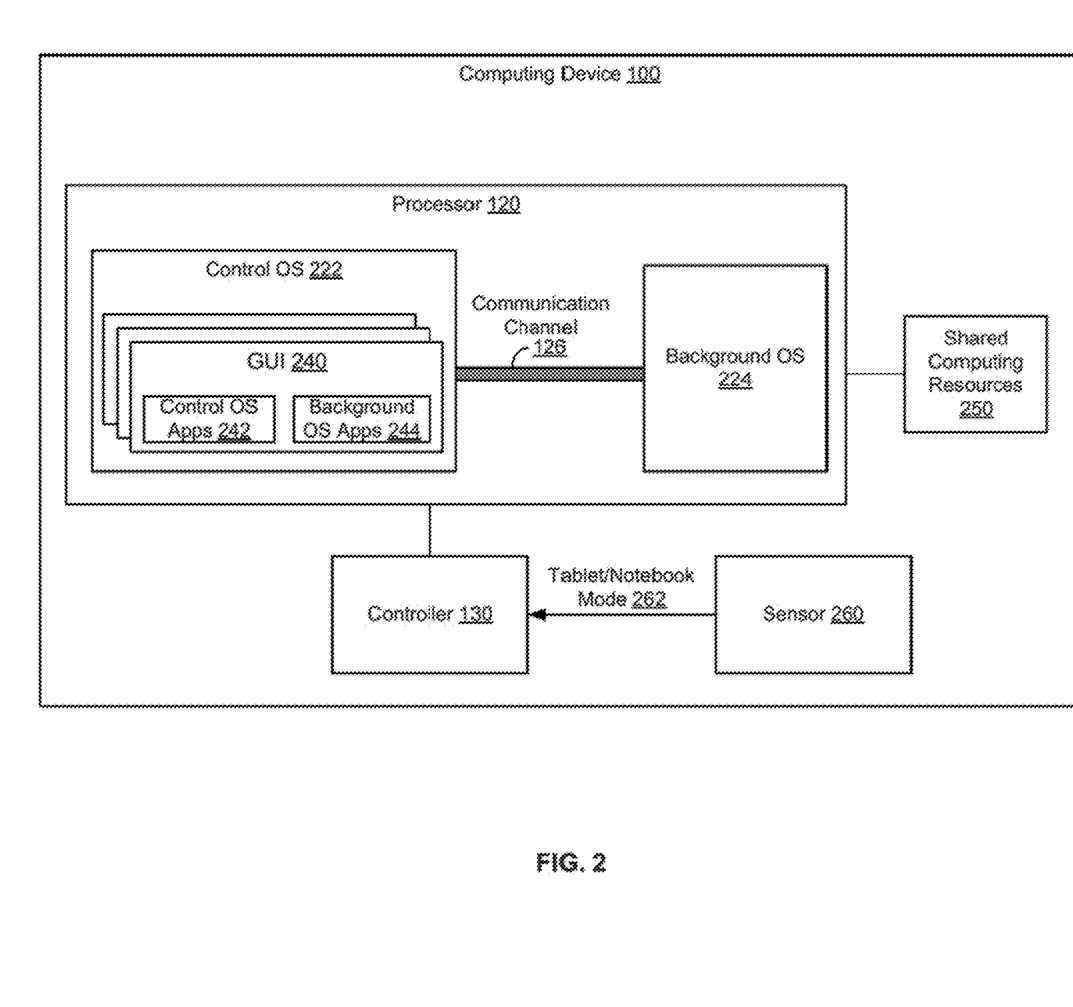
FIG. 2 illustrates another example of a computing device including first and second operating systems and a controller to select an operating system based on a mode of the computing device.

FIG. 2 is another example of a computing device including first and second operating systems and a controller to select an operating system based on a mode of the computing device. In the example of FIG. 2, computing device 100 includes processor 120, controller 130, shared computing resources 150, and sensor 260.

Processor 120 includes control operating system 222 and background operating system 224. Control operating system 222 can be one of first operating system 122 and second operating system 124 of FIG. 1, and background operating system 224 can be the other of the first operating system 122 and second operating system 124. Control operating system 222 and background operating system 224 are selected based on a current mode (i.e., tablet mode or notebook mode) of the device 100. Further, control operating system 222 and background operating system 224 communicate data (e.g., commands, messages, input, output, content, etc) via communication channel 126.

Sensor 260 can be, for example, an activation sensor, an electrical sensor, a mechanical sensor, or another type of sensor that can detect when the display member is separated from the base member or attached to the base member (i.e., in a tablet mode or a notebook mode). For example, the sensor 260 can detect when a release (e.g., a button, a slide switch, or another type of release) is activated to separate the display member from the base member. The sensor 260 can send an indication of the mode 262 to the controller. Based on the mode 262 of the device 100, controller 130 selects which of the first and second operating systems is the control operating system 222 and which other of the first and second operating systems is the background operating system 224.

Control operating system 222 can operate one or more GUIs 240. GUI 240 allows users to interact with the device 100 through graphical icons and visual indicators, for example. Control operating system 222 can launch and execute applications 242 designed for or associated with the control operating system 222 (i.e., one of first and second operating systems) and applications 244 designed or associated with the background operating system 224 (i.e., the other of first and second operating systems), and allow the user interact with the applications via the GUI 240. GUI 240 is present to the user on a display device of the display member.

When the background operating system application 244 is launched on the GUI 240, the user may provide input and receive input over the GUI 240. The input is forwarded to the background operating system 224 via the communication channel 126, and corresponding output is passed from the background operating system 224 to the control operating system 222 via the communication channel 125 for display on the GUI 240.

Further, control operating system 222 and background operating system 224 share computing resources 250. Computing resources 250 may include, for example, a mass storage device (e.g., HDD, SDD, etc), input/output controller, memory, file storage system, etc. In some examples, the control operating system 222 and the background operating system 224 can access the same file using a different path. To illustrate, if the background operating system 224 stores personal files (e.g., photos, documents, etc.) in a different location than the control operating system 222, the file locations can be mapped such that the personal files stored by the background operating system 224 can be seen on the control operating system's personal file library.

Figure 3:
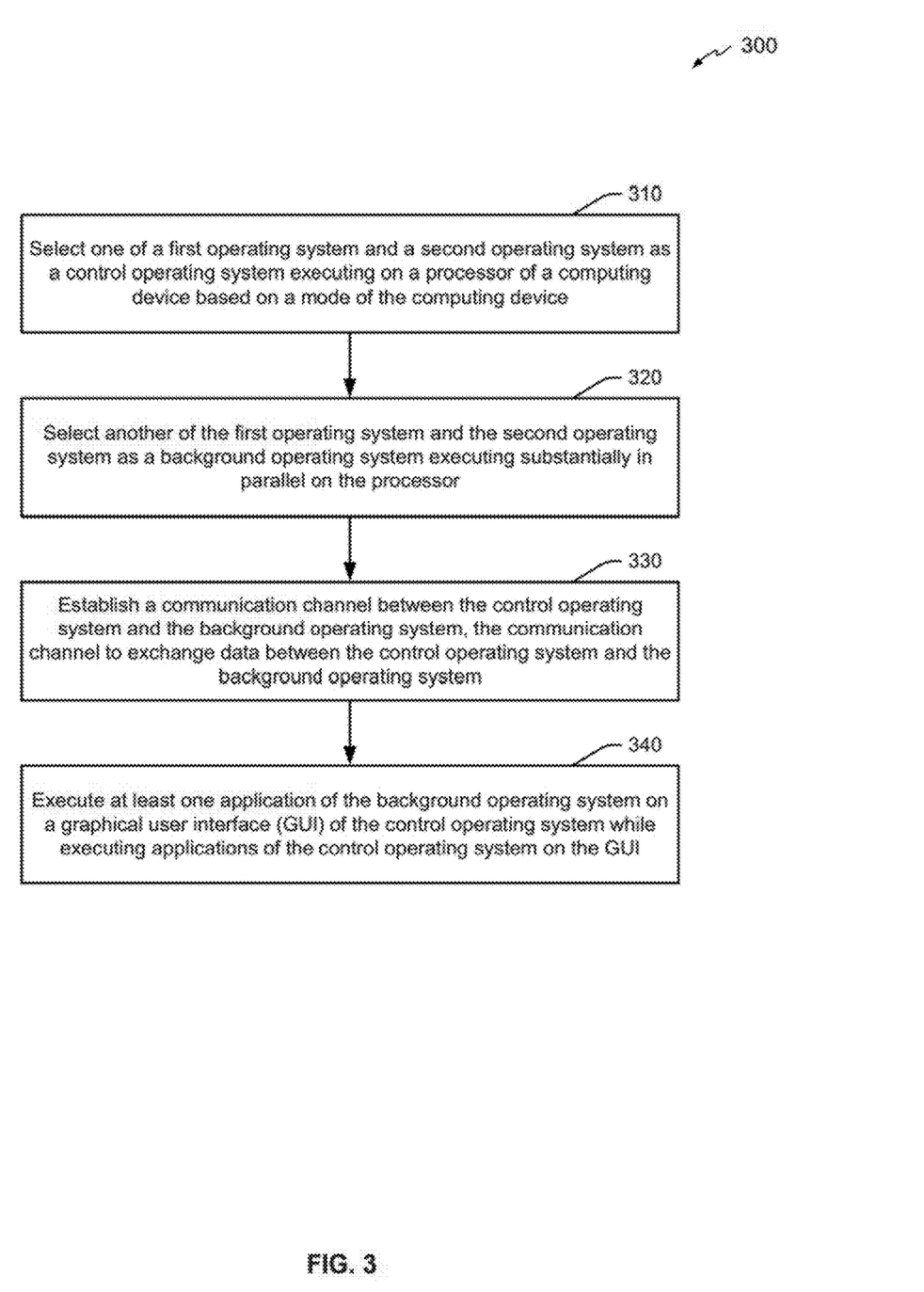
FIG. 3 is an example flowchart illustrating a method for selecting between first and second operating systems based on a mode of a computing device.

FIG. 3 is an example flowchart illustrating a method for selecting between first and second operating systems based on a mode of a computing device. Method 300 may be implemented, for example, in the form of executable instructions stored on a non-transitory computer-readable medium and/or in the form of electronic circuitry.

Method 300 includes selecting one of a first operating system and a second operating system as a control operating system executing on a processor of a computing device based on a mode of the computing device, at 310. For example, controller 130 can select either one of the first operating system 122 and the second operating system 124 as the control operating system 222 based on whether the device 100 is in a tablet mode or a notebook mode.

Method 300 includes selecting another of the first operating system and the second operating system as a background operating system executing substantially in parallel on the processor, at 320. For example, controller 130 can select either one of the first operating system 122 and the second operating system 124 as the background operating system 225 based on the mode 262 (tablet or notebook) of the device 100.

Method 300 includes establishing a communication channel between the control operating system and the background operating system, the communication channel to exchange data between the control operating system and the background operating system, at 330. For example, control operating system 222 and background operating system 224 can exchange user input, output, commands, messages, and other data via communication channel 126.

Method 300 includes executing at least one application of the background operating system on a graphical user interface (GUI) of the control operating system while executing applications of the control operating system, using the communication channel, at 340. For example, background operating system applications 244 can be loaded, launched and executed on the GUI 240 of the control operating system, whereby user input/output are exchanged via the communication channel. In some examples, the method 300 of FIG. 3 includes additional steps in addition to and/or in lieu of those depicted in FIG. 3.

Figure 4:
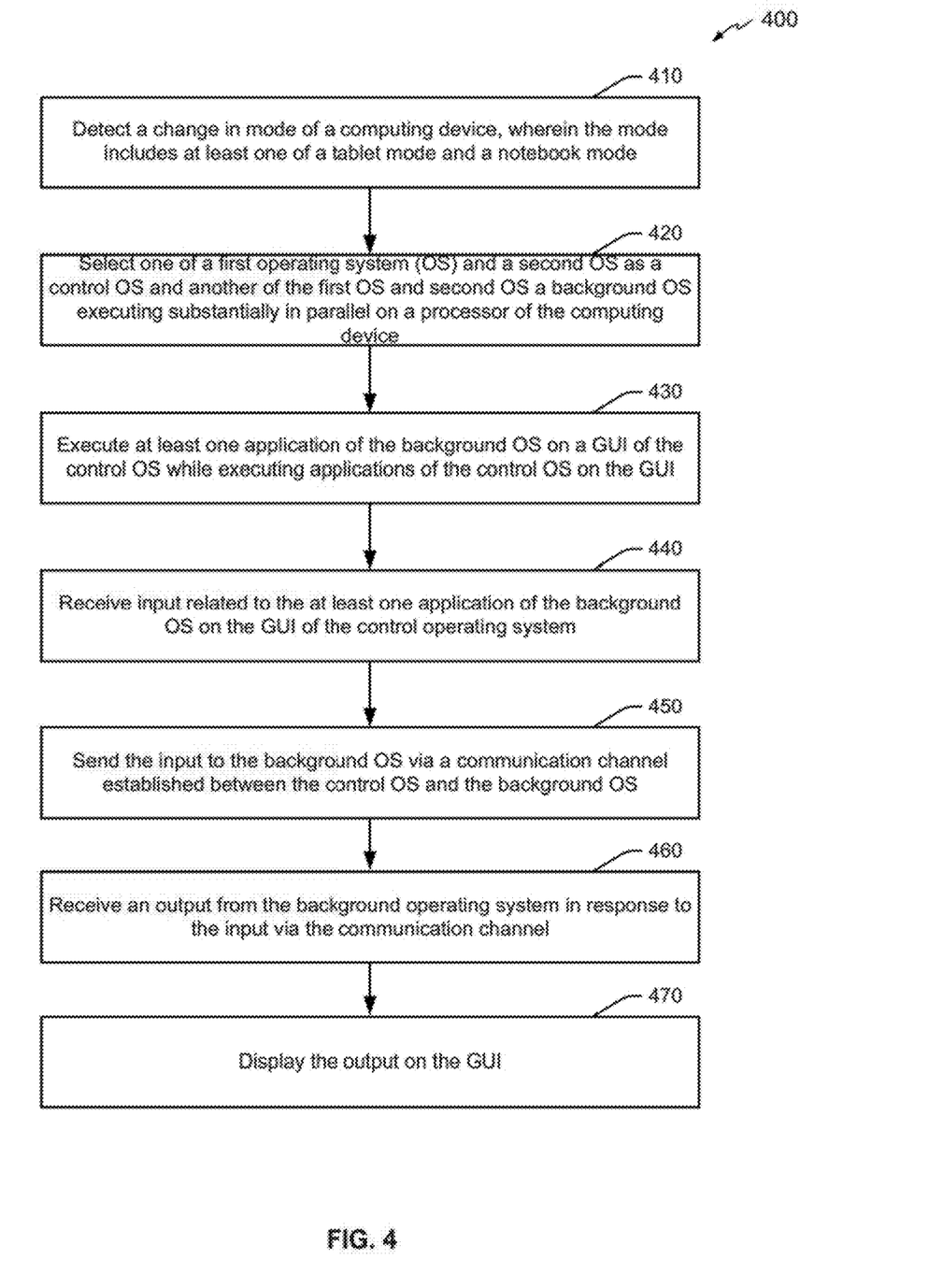
FIG. 4 is another example of a flowchart illustrating a method for selecting between first and second operating systems based on a mode of a computing device.

FIG. 4 is another example of a flowchart illustrating a method for selecting between first and second operating systems based on a mode of a computing device. Method 400 may be implemented, for example, in the form of executable instructions stored on a non-transitory computer-readable storage medium and/or in the form of electronic circuitry.

Method 400 includes detecting a change in mode of a computing device, where the mode includes at least one of a tablet mode and a notebook mode, at 410. For example, sensor 260 can determine when the device 100 is one of a tablet mode and a notebook mode and notify the controller 130.

Method 400 includes selecting one of a first operating system and a second operating system as a control operating system, and selecting another of the first operating system and second operating system as a background operating system executing substantially in parallel on a processor of the computing device, at 420.

Method 400 includes executing at least one application of the background operating system on a graphical user interface (GUI) of the control operating system while executing applications of the control operating system on the GUI, at 430.

Method 400 includes receiving input related to the at least one application of the background operating system on the GUI of the control operating system, at 440. Method 400 includes sending the input to the background operating system via a communication channel established between the control operating system and the background operating system, at 450. Method 400 includes receiving an output from the background operating system in response to the input via the communication channel, at 460. Method 400 also includes displaying the output on the GUI.

For example, the user can interact with the application of the background operating system 224 via the GUI 240. Input can be passed from the GUI 240 to the background operating system 224 via the communication channel 126, and output can be passed from the background operating system 224 to the GUI 240 via the communication channel 126. In some examples, the method 400 of FIG. 4 includes additional steps in addition to and/or in lieu of those depicted in FIG. 4.

Figure 5:
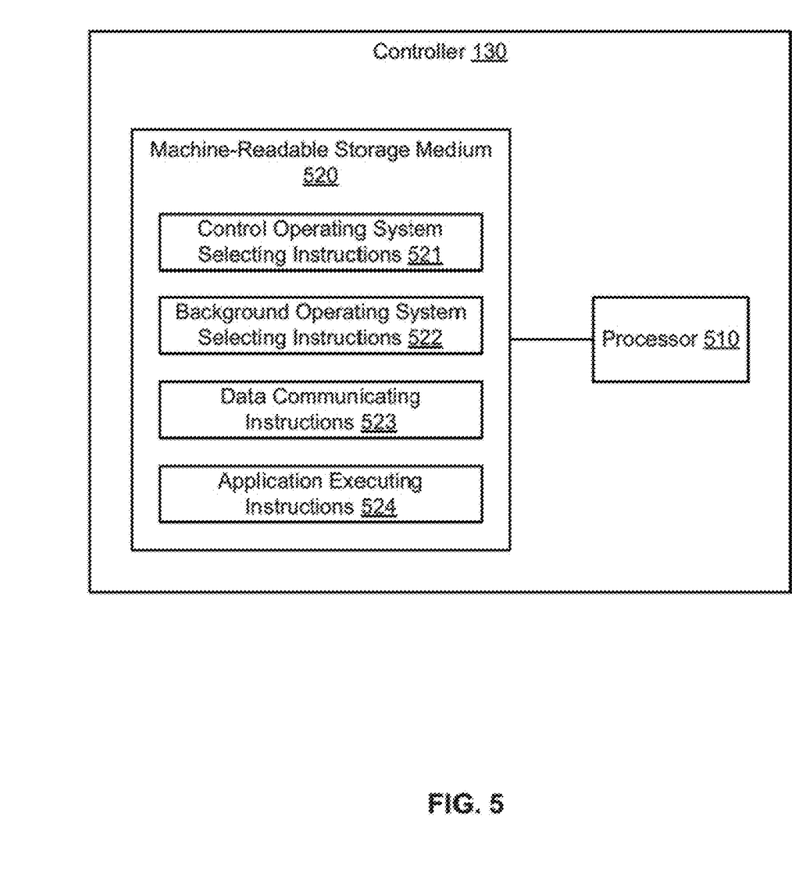
FIG. 5 illustrates an example of a controller including a computer-readable medium having instructions to select between first and second operating systems based on a mode of the computing device.

FIG. 5 illustrates an example of a controller including a computer-readable medium having instructions to select between first and second operating systems based on a mode of the computing device. Controller 130 can include a non-transitory computer-readable medium 520. The non-transitory computer-readable medium 520 can include instructions 521-524 that if executed by a processor 510 can cause the controller 130 to perform the functionality described below.

For example, control operating system selecting instructions 521 are executable to select one of a first operating system and a second operating system as a control operating system executing on a processor of the computing device based on whether the computing device is in a tablet mode or a notebook mode. Background operating system selecting instructions 522 are executable to select another of the first operating system and the second operating system as a background operating system executing substantially in parallel on the processor, based on whether the computing device is in the tablet mode or the notebook mode. Data communicating instructions 523 are executable to communicate data between the control operating system and the background operating system. Application executing instructions 524 are executable to launch and execute at least one application of the background operating system on a graphical user interface (GUI) of the control operating system in parallel with execution of application of the control operating system on the GUI.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed hereto. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A hybrid computing device comprising:
   a processor;
   a first operating system;
   second operating system;
   a communication channel to exchange data between the first and second operating systems; and
   a controller to select, based on a notebook computer mode of the computing device, the first operating system as a control operating system, and the second operating system as a background operating system, wherein the control and background operating systems are executable in parallel on the processor,
   the control operating system to receive a user keyboard input made on a keyboard of the hybrid computing device, and to pass the user keyboard input to the background operating system over the communication channel,
   wherein the background operating system is to respond to the user keyboard input by sending responsive data to the control operating system, the control operating system to output the responsive data on a graphical user interface of the control operating system.

2. The hybrid computing device of claim 1, wherein the control operating system is to control input and output operations of the hybrid computing device in a first mode.

3. The hybrid computing device of claim 2, wherein the control operating system is to execute applications of the background operating system on multiple graphical user interfaces (GUIs) of the control operating system substantially in parallel with applications of the control operating system.

4. The hybrid computing device of claim 3, wherein the control operating system is to receive data from the background operating system via the communication channel, wherein the user keyboard input and the received data are related to the applications of the background operating system.

5. The hybrid computing device of claim 1, wherein the first operating system and the second operating system share computing resources of the hybrid computing device, wherein the computing resources include a memory, file storage, an input/output controller, and a central processing unit (CPU).

6. The hybrid computing device of claim 1, further comprising a sensor to detect that the hybrid computing device has switched from a tablet computer mode to the notebook computer mode, the controller to switch, in response to detecting that the hybrid computing device has switched from the tablet computer mode to the notebook computer mode, the first operating system to be the background operating system, and the second operating system to be the control operating system.

7. The hybrid computing device of claim 6, wherein the sensor comprises an activation sensor, and wherein the activation sensor comprises at least one of an electrical sensor or a mechanical sensor.

8. The hybrid computing device of claim 1, wherein when the computing device is in a tablet computer mode, the second operating system is to receive a touch input on a touchscreen and pass the touch input on the touchscreen to the first operating system, and the first operating system is to respond to the touch input by sending further responsive data to the second operating system, the second operating system to output the further responsive data on a graphical user interface of the second operating system.

9. A method comprising:
   selecting, in response to detecting a notebook computer mode of operation of a computing device, a first operating system as a control operating system executing on a processor of the computing device;
   selecting, in response to detecting the notebook computer mode of operation of the computing device, a second operating system as a background operating system executing substantially in parallel on the processor with the control operating system;
   establishing a communication channel between the control operating system and the background operating system, the communication channel to exchange data between the control operating system and the background operating system;
   receiving, by the control operating system, a user keyboard input made on a keyboard of the computing device, and passing, by the control operating system, the user keyboard input to the background operating system over the communication channel; and executing an application of the background operating system on a graphical user interface (GUI) of the control operating system while executing applications of the control operating system on the GUI;

sending, by the background operating system in response to the user keyboard input, responsive data to the control operating system; and outputting, by the control operating system, the responsive data in the GUI on a display member.

10. The method of claim 9, wherein the control operating system controls the keyboard and the display member of the computing device, and the user keyboard input relates to the application of the background operating system on the GUI of the control operating system.

11. The method of claim 9, wherein the first and second operating systems share resources of the computing device, wherein the resources include file storage, a memory, processing resources, and input/output controllers.

12. The method of claim 9, further comprising:
selecting, in response to detecting a second mode of operation of the computing device, the first operating system as the background operating system; and
selecting, in response to detecting the second mode of operation of the computing device, the second operating system as the control operating system.

13. The method of claim 9, wherein when the computing device is in a tablet computer mode, the second operating system receives a touch input on a touchscreen and passes the touch input on the touchscreen to the first operating system, and the first operating system responds to the touch input by sending further responsive data to the second operating system, the second operating system outputting the further responsive data in a GUI on the display member.

14. A non-transitory computer-readable storage medium comprising instructions that if executed cause a controller of a computing device to:
select, in response to detecting a notebook computer mode of operation of the computing device, a first operating system as a control operating system executing on a processor of the computing device;
select, in response to detecting the notebook computer mode of operation of the computing device, a second operating system as a background operating system executing substantially concurrently on the processor with the control operating system;
communicate data between the control operating system and the background operating system over a communication channel;
receive, by the control operating system, a user keyboard input made on a keyboard of the computing device, and pass, by the control operating system, the user keyboard input to the background operating system over the communication channel; and
launch and execute an application of the background operating system on a graphical user interface (GUI) of the control operating system substantially concurrently with execution of applications of the control operating system on the GUI,
wherein the background operating system responds to the user keyboard input by sending responsive data to the control operating system, and the control operating system outputs the responsive data on the GUI of the control operating system.

15. The non-transitory computer-readable medium of claim 14, wherein the instructions if executed cause the controller to:
select, in response to detecting a second mode of operation of the computing device, the first operating system as the background operating system; and
select, in response to detecting the second mode of operation of the computing device, the second operating system as the control operating system.

16. The non-transitory computer-readable storage medium of claim 14, wherein when the computing device is in a tablet computer mode, the second operating system receives a touch input on a touchscreen and passes the touch input on the touchscreen to the first operating system, and the first operating system responds to the touch input by sending further responsive data to the second operating system, and the second operating system outputs the further responsive data on a GUI.

* * * * *

UNITED STATES PATENT AND TRADEMARK OFFICE
CERTIFICATE OF CORRECTION

PATENT NO. : 9,778,938 B2
APPLICATION NO. : 14/911279
DATED : October 3, 2017
INVENTOR(S) : Evan Joel Wilson Page 1 of 1

It is certified that error appears in the above-identified patent and that said Letters Patent is hereby corrected as shown below:

In Column 7, Line 54, in Claim 1, delete "second" and insert -- a second --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*